Feb. 20, 1968  D. E. WOLFORD  3,369,754
METHOD AND APPARATUS FOR UNIFORMLY DISTRIBUTING
TREATMENT MATERIAL BY AIR
Filed Sept. 20, 1966  2 Sheets-Sheet 1

INVENTOR.
DALE E. WOLFORD
BY Toulmin & Toulmin
ATTORNEYS

Feb. 20, 1968  D. E. WOLFORD  3,369,754
METHOD AND APPARATUS FOR UNIFORMLY DISTRIBUTING
TREATMENT MATERIAL BY AIR
Filed Sept. 20, 1966  2 Sheets-Sheet 2

FIG-4

LARGE DROPLETS  ATOMIZED DROPLETS

FIG-5

INVENTOR.
DALE E. WOLFORD
BY Toulmin & Toulmin
ATTORNEYS

United States Patent Office 3,369,754
Patented Feb. 20, 1968

3,369,754
METHOD AND APPARATUS FOR UNIFORMLY DISTRIBUTING TREATMENT MATERIAL BY AIR
Dale E. Wolford, Ashland, Ohio, assignor to The F. E. Myers & Bro. Co., Ashland, Ohio, a corporation of Ohio
Continuation-in-part of application Ser. No. 295,895, July 18, 1963. This application Sept. 20, 1966, Ser. No. 596,713
7 Claims. (Cl. 239—8)

ABSTRACT OF THE DISCLOSURE

Spraying apparatus, and method, wherein an air blast blown through a vertically elongated discharge opening of substantially uniform width carries treatment material out over a surface to be treated and the material is supplied to the upper portion of the blast in a greater concentration than to the lower portion of the blast.

This invention relates to a method and apparatus for the application of treatment materials to vegetation and, in particular, to a method and apparatus of this nature in which the carry of the material is increased and the drift of the material is minimized, and the coverage is improved.

This application is a continuation-in-part of application Serial No. 295,895, filed July 18, 1963, and entitled "Air Carry Method of Treatment Material."

The application of treatment materials to vegetation or to ground areas is a well known operation, such treatment materials including insecticides, fungicides or, generally, herbicides.

Heretofore, when a substantial area was to be covered with such treatment material, boom means with multiple nozzles thereon were employed which extended out over the region to be treated at a certain height and delivered the treatment material through the nozzles. This arrangement has the distinct drawback of preventing proper application of the treatment materials in obstructed areas where the booms are obstructed as by trees or buildings. Still further, booms of this nature are subject to frequent breakdowns and the manipulation devices associated with the booms are complex and represent sources of maintenance difficulties. The apparatus is also quite bulky due to the long booms and the devices for moving the booms, and the problems are thus presented in moving the equipment about, and in collapsing the mechanism for storage and the like.

This same arrangement, utilizing boom means and nozzles distributed thereon is also particularly inefficient when the material is being applied at a relatively low rate as measured in gallons of material applied to an acre. In such a case extremely fine droplets are required to be delivered from the nozzle means to obtain relatively complete coverage, and these small droplets are subject to evaporation, drift and the like while adjustment of the nozzles to make the discharge from all thereof uniform is different.

Another arrangement that has been tried out and used to some extent for the above-mentioned type of application is the arrangement of broadcast nozzles on the center or on one or both sides of a spray vehicle. These nozzles are of a special design and deliver a fan-shaped spray pattern with widths of up to 30 feet. This method, however, also has definite limitations in that it is not possible to obtain effective complete or total coverage without the use of higher gallonage per acre than is entirely justified. Still further, the swath widths are limited to about 30 feet unless excessive quantities of treatment liquid are employed.

With the foregoing in mind, a primary object of the present invention is to provide an improved method for the application of treatment material to areas in which the foregoing drawbacks that characterized the methods according to the prior art are eliminated.

A particular object of the present invention is to provide an air carry method for applying treatment material to large areas in which uniform application of the treatment material can be had.

A still further object of this invention is the provision of a method and apparatus for the uniform application of treatment material to extended areas which will result in substantially uniform coverage of the areas, but in which the apparatus is simple to use and is relatively compact and is not influenced by obstructions in the area to be treated.

Still a further object of this invention is the provision of a method and apparatus for distributing treatment material over an area by means of vehicle air, and by so distributing the material in the air that uniform treatment of the area results while maintaining the consumption of the treatment material at a minimum.

It is also an object of this invention to provide a device for carrying out the method referred to in which the device is readily adjustable to meet varying circumstances whereby the method can be practiced on areas that are inclined either upwardly or downwardly from the operative apparatus.

These and other objects and advantages of this invention will become more apparent upon reference to the following specification taken in connection with the accompanying drawings, in which:

FIGURE 4 is a diagrammatic view showing the manner in which the distribution of material is effected by an arrangement according to the present invention; and FIGURE 5 is a more or less diagrammatic showing of a modified arrangement in which the treatment material is in the form of a powder or fine granular material.

Figure 1:
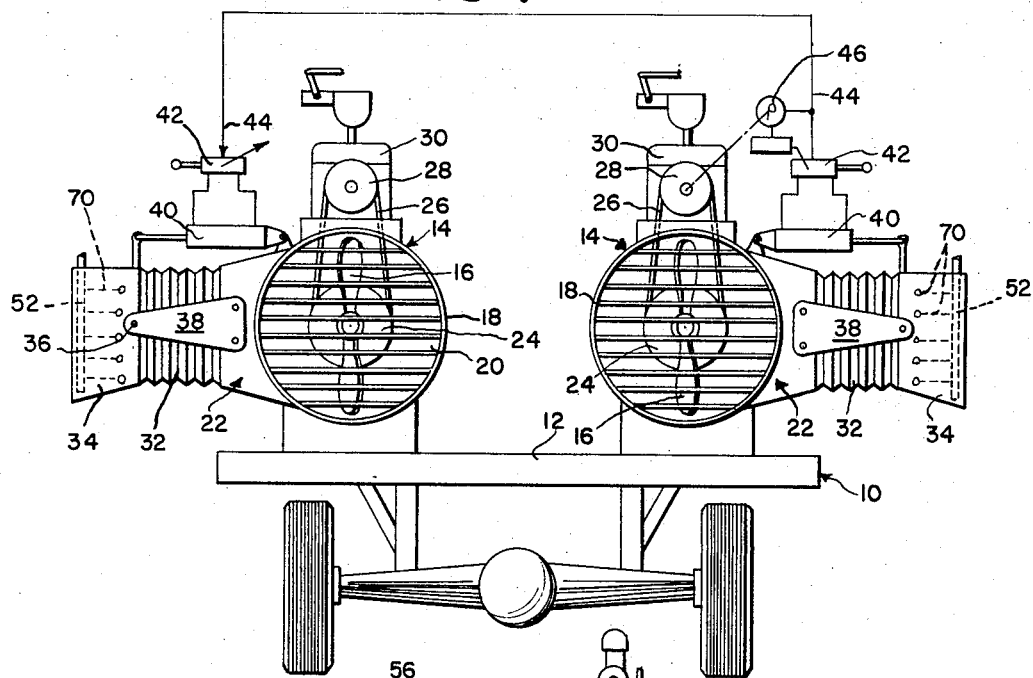
FIGURE 1 is a somewhat diagrammatic rear elevational view of a vehicle carrying spraying equipment according to the present invention.

Referring to the drawings somewhat more in detail, 10 indicates generally a vehicle such as a flat bed truck or other vehicle having a platform area 12 on which is mounted one or more spraying devices 14 according to the present invention. Each spraying device comprises air impeller means 16, a propeller element for example, in a housing 18 having air inlet means 20 and having an air discharge conduit 22 leading from the side thereof.

Impeller means 16 is provided with a pulley 24 connected by belt 26 with pulley 28 on the output shaft of an engine 30.

The air discharge conduit 22 includes a flexible region 32, a fabric bellows, for example, and there is a rigid terminal portion 34 connected with the bellows and pivoted at 36 to support means 38. Terminal portion or outlet member 34 is adapted for being tilted about its pivotal support by a hydraulic motor 40 connected between the housing of the device and the said outlet member and under the control of a valve 42. This valve can be manipulated to cause motor 40 to adjust outlet member 34 either upwardly or downwardly or to block the hydraulic motor to hold the outlet member in any desired adjusted position. Valve 42 is supplied with pressure fluid via conduit 44 which leads to the discharge side of a fluid pump 46 driven by the engine of one of the spraying devices.

Figure 2:
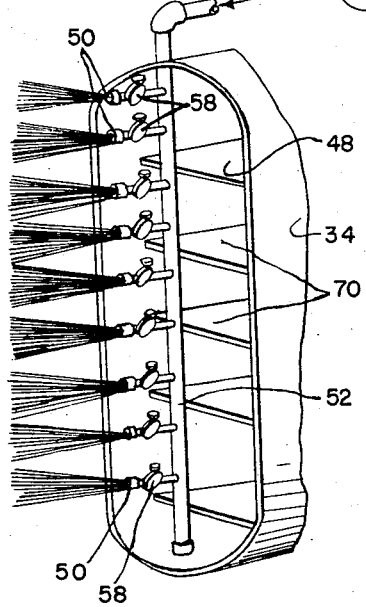
FIGURE 2 is a perspective view showing the air outlet from one of the spraying devices illustrating the location therein of nozzles through which the treatment material is injected into the air blast.

As will be seen in FIGURE 2, outlet member 34 has an opening 48 through which the air blast developed by impeller means 16 passes. Located in this outlet are nozzle means 50 which may be connected to a manifold pipe 52 and supplied with treatment liquid thereby. Manifold 52 is supplied with liquid under pressure from a tank 54 by way of pump 56 which may be driven by one of the engines 30, or which may be driven by its own engine or by the engine of the vehicle 10.

Each of the nozzle means 50 is provided with its own control valve 58 so that exact control of the rate of supply of material therethrough to the air stream can be effected. It is also contemplated that the nozzles themselves may be varied in size so that smaller droplets of the treatment liquid will be injected into the air stream adjacent the bottom of outlet opening 48 with progressively larger droplets being introduced into the air stream through successively higher nozzles, and the largest droplets therefore being introduced through the upper nozzles. This can be effected either by individually controlling the liquid supply to the individual nozzles or by forming the nozzles with different orifice sizes, and it is intended to include both methods and arrangements within the purview of the present invention.

Figure 3:
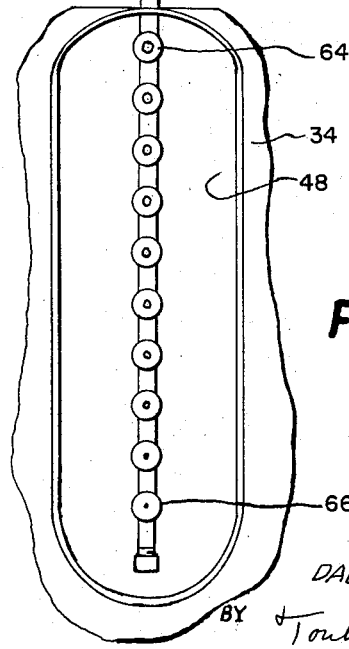
FIGURE 3 is a view looking in at the air discharge opening of a modified arrangement according to the present invention.

The modification illustrated in FIGURE 3 is substantially that shown in FIGURE 2, except that located above the discharge opening 48 are nozzles 60 each having individual control valves 62 for regulating the supply of treatment liquid thereto, or for closing off the nozzles entirely. This figure also shows that the uppermost nozzle 64 in the discharge opening has the largest orifice with the orifices becoming progressively smaller toward the the bottom so that the lowermost nozzle 66 has the smallest orifice. From the smaller, lower orifices, the liquid treatment material may approach a condition of atomization without any disadvantage as will be evident hereinafter.

The liquid is supplied to the nozzles at a pressure on the order of 30 pounds per square inch, and the effect of this will be to minimize the atomization of the liquid treatment material, thereby substantially eliminating the drift hazard. The treatment material, instead of being injected in atomized form into the air stream, will be introduced in droplets varying in size as mentioned above, and these droplets are much more readily controlled and are less influenced by extraneous air currents and settle more quickly in the area to be treated than would be the case with atomized liquid, as would occur if the pressure on the material supplied to the nozzles was extremely high.

Further, the velocity of the air leaving the discharge opening is maintained at a maximum of about 50 m.p.h. and is substantialy uniform over the clear section of the discharge opening, and this reduction in discharge air velocity over what is usually employed in air carry spraying devices, tends to maintain the liquid in its droplet form while, at the same time, the swath width is not substantially decreased. The fact that the droplets of treatment liquid are not fractured or broken up into substantially atomized state also tends to minimize drift thereof and the droplets remain in control and thus can be distributed over the area being treated continuously according to the pattern determined.

Carrying the droplets in air, as described, has proved to represent a substantial advantage over carrying the treatment liquid in vehicle water because less equipment is required and less volume of liquid must be conveyed about, and the gallonage rate of treatment liquid per acre can be substantially decreased while the swath width can be increased. It has been found that a greater percentage of the treatment liquid finds a resting place on the vegetation when air is employed as a carrier than when the treatment liquid is conveyed by water vehicle because the water will drain from the vegetation and drop to the ground carrying with it the treatment material contained therein.

The diagrammatic representation in FIGURE 4 will show that the larger droplets introduced into the air stream in the upper portion of the outlet opening are conveyed outwardly to the far side of the swath, while the finer droplets, which may be substantially atomized as mentioned before, can be injected into the air stream in the lower portion of the outlet opening from the near part of the swath. The reason that the last mentioned portion of the treatment liquid can be substantially atomized is that it is arranged to drop close to the operating machine and there is thus minimum drift hazard in any case.

It will be evident that the tilting of the discharge member can be employed for adjusting the device for the spraying of inclines which extend either upwardly or downwardly from the spraying machine. This can readily be accomplished by manipulation of the discharge outlet through its pertaining hydraulic motor 40. A further advantage of the structure shown is that the extended discharge fitting of the present invention permits the mass of the spraying machine to be located inwardly from the outer edge of the conveying vehicle, and this provides for improved conditions over other arrangements wherein the entire spraying machine is tilted to negotiate slopes thereby requiring the spraying machine to be located at or even overhanging the edge of the conveying vehicle.

As to the size of the swath that can be covered in accordance with the present invention, it has been found that widths up to 120 feet can be adequately treated and this, of course, would represent a considerable advantage where regions are to be treated which are inaccessible but which are adjacent to a roadway.

It will be understood that the outlet members 34 could be provided with deflecting vane means as indicated at 70 in FIGURE 1 for the purpose of controlling the air blast from the outlet opening if such control proved to be necessary or desirable. Vane means 70 extend generally in the direction of movement of the air blast through the discharge member but can be adjusted angularly in the discharge member to exert a controlling influence on the direction of the air blast.

FIGURE 5 is a somewhat modified arrangement in which a spraying machine 80 is provided on a conveying vehicle 82, said machine having a drive engine 84 and being provided with a tiltable discharge member 86 which can be adjusted about its pivotal support 88 by fluid motor 90 while bellows 92 directs the air into the discharge member.

FIGURE 5 shows an arrangement for supplying powder or granular material to the air stream, and this takes the form of a supply hopper 94 which delivers the material to a feed screw 96 driven by a motor 98, an adjustable speed motor for example. The feed screw 96 delivers the material to the upper ends to a plurality of feed tubes 98' which are located in a row in the plane of the central axis of the discharge member. These tubes are adjustable in length, and preferably have their terminal ends cut off at an angle as at 100 so that the material dropping therethrough will be introduced into the conveying air stream in the desired distribution pattern. The concentration of the supplied material is dependent upon the manner in which the tubes 98' are adjusted so that it will be evident that the desired pattern of distribution of the material in the air stream can be effected. This distribution will thus substantially duplicate for the granular material the distribution described for the liquid material so that the same advantages will obtain with respect to distribution of material over the width of the swath being treated and freedom from drift thereof.

The arrangement of FIGURE 5 can also include air control vane means 102 located in the path of the air in the outlet member 86 if desired or necessary.

By way of further explanation as to the merits of the method and apparatus for distributing spray material according to the present invention, the main problem in the application of herbicides and the like has been even distribution at the correct chemical rate over an area to be treated. Furthermore, it is important to maintain an absolute minimum of drift of the chemical beyond the area to be treated so that the rate of application per unit area will be known. Still further, herbicides of the nature that can be referred to as selective kill, total kill, or as growth retardants, can be very damaging to farm crops which might be adjacent right of way areas that are being treated.

With the air spraying of fungicides and pesticides it is quite often satisfactory to inject the material into a high velocity air stream because in materials of this type, drift does not introduce complications, and extremely careful application of the material is of no particular economic concern.

It has been the practice for many years to apply herbicides by booms because it was thought impossible to make safe application thereof by means of an air blast. By the present invention, however, with a relatively low air velocity of about 40–60 m.p.h. at a blower outlet, and with the velocity of the air being substantially uniform over the entire area of the outlet, and by furthermore selectively sizing of the droplets across the spray swath in the vertical direction, excellent results have been obtained. The method thus involves the discharge of small droplets from the machine near the lower end of the air outlet opening and graduating the droplets to the largest droplet size at the upper end of the discharge opening.

Extensive tests and experimentation with the method and apparatus of the present invention have shown that:

(1) This method produces less spray drip than conventional hydraulic booms;

(2) the blower unit at truck or vehicle eliminates all cumbersome boom wings which reduce application rate and are subject to excessive breakage and/or down time;

(3) the outer tip which consists of large droplets of the spray swath can be definitely defined by control of swath width with blower outlet elevation control;

(4) spray swath widths up to 110 feet on one side are possible with this equipment. This coverage reach is impractical by booms and overhead nozzles;

(5) air velocities of 40 to 60 miles per hour do not atomize or break up the larger droplets in the air stream. Velocity of liquid discharged by nozzle is relatively equal to air velocity issuing from the blower unit;

(6) the air column serves to distribute the solid stream discharge from the larger nozzles into a very uniform deposit pattern; and (7) the smaller droplets discharged near the machine have a much longer distance, therefore time, to travel before drifting beyond area to be treated. These fine droplets therefore present little or no hazard. They are, however, required in order to obtain uniform coverage near the machine where air from the blower would not evenly distribute larger spray droplets.

From the foregoing it will be appreciated that the present invention provides a method and apparatus especially adapted for the air-carry distribution of treatment materials for vegetation, and particularly herbicides which must be closely confined to a predetermined region to be treated so that other vegetation in the vicinity will not be damaged thereby.

It will be understood that this invention is susceptible to modification in order to adapt it to different usages and conditions and, accordingly, it is desired to comprehend such modifications within this invention as may fall within the scope of the appended claims.

What is claimed is:

1. A method of applying treatment material to vegetation which comprises: developing a substantially horizontal air blast which is greater in dimension in the vertical direction than in the lateral direction and with the air velocity substantially uniform over the cross section of the blast, and projecting the air blast outwardly over the region to be treated, introducing treatment material in vertically distributed relation into the air blast along the vertical center line therein, and so distributing the material in the air blast that there is a greater concentration of the material per unit volume of air of the air blast in the upper portion of the air blast than in the lower portion thereof to provide for substantially uniform application of the material to the region being treated, delivering said material to the air blast in the form of droplets of liquid which progressively decrease in size from the upper portion of the air blast to the lower portion thereof and controlling the size of said droplets by regulating the rate of material flow through said nozzles so that the droplets of material supplied by the nozzles progressively decrease in size from the top of the discharge opening toward the bottom thereof.

2. A method according to claim 1 in which the pressure on the liquid supplied to the nozzles is regulated so that no atomization thereof occurs in at least the liquid supplied from the nozzles in the upper portion of said discharge opening.

3. An apparatus for spraying liquid treatment material to a region to be treated thereby which comprises: means for developing an air blast and for directing the air blast outwardly over the region to be treated in a direction substantially parallel to the surface of the region, said means comprising a discharge member having a discharge opening elongated in a direction perpendicular to the plane of the surface being treated and of substantially constant dimension laterally, and treatment material supply means arranged substantially in the plane of the longer axis of said discharge opening for supplying the treatment material to said air blast and operable for supplying said treatment material to the air blast at a more rapid rate per unit volume of air toward the upper end of said opening than toward the lower end of said opening, said supply means comprise nozzles and a vertical manifold on which said nozzles are carried in vertically distributed relation and which supplies treatment liquid to said nozzles, said manifold being mounted in said member near the discharge opening thereof, said nozzles having progressively smaller orifice openings therein from the upper portion of said discharge opening to the lower portion thereof and control valves associated with said nozzles for regulating the rate of material flow.

4. An apparatus according to claim 3 in which said manifold extends beyond the upper end of said discharge opening and has other nozzles therein which supply liquid to the top of said air blast.

5. An apparatus according to claim 3 in which said discharge member has adjustable vane means therein to control the direction of the air blast issuing from said discharge opening relative to the longitudinal axis of said discharge member.

6. In an apparatus for supplying treatment material to a region to be treated by said material; blower means for developing an air blast and having an outlet, a tubular discharge member having an inlet spaced from said blower outlet and also having an air discharge opening, said discharge opening being elongated in the vertical direction, flexible tubular bellows-like conduit means connecting the blower outlet with said inlet of said discharge member, support arm means extending along opposite sides of said conduit means and pivoted at the one end to one of said member and said blower means and fixed at the other end to the other thereof, and motor means connected between said blower means and said discharge member selectively operable for adjusting said discharge member in the vertical direction about the pivotal connection of said support arm means to control the direction of the air blast as it leaves said discharge opening of said discharge member, and means extending along the vertical central axis of said discharge member near the said discharge opening thereof for supplying treatment material in distributed relation to the air blast and in such a manner that the rate of supply of the material per unit volume of air toward the upper end of said discharge opening is greater than the rate of supply of material per unit volume of air toward the lower end of the discharge opening.

7. An apparatus according to claim 6 in which said discharge member has control vanes therein extending generally parallel to the direction of air flow through the member and angularly adjustable for influencing the direction of movement of the air blast from the discharge opening.

References Cited

UNITED STATES PATENTS

| | | | |
|---|---|---|---|
| 1,102,354 | 7/1914 | Pougnet. | |
| 2,593,275 | 4/1952 | Daugherty | 239—78 |
| 2,608,792 | 9/1952 | Chater | 239—77 |
| 2,635,920 | 4/1953 | Boyce | 239—77 |
| 2,736,605 | 2/1956 | Spreng | 239—78 |
| 2,828,158 | 3/1958 | Patterson | 239—78 |
| 2,944,388 | 7/1960 | Bayer. | |
| 3,069,091 | 12/1962 | Giesse et al. | 239—77 |

FOREIGN PATENTS

| | | |
|---|---|---|
| 581,135 | 8/1958 | Italy. |

M. HENSON WOOD, Jr., *Primary Examiner.*

VAN C. WILKS, *Assistant Examiner.*